United States Patent

Timperi et al.

[11] Patent Number: 5,735,325
[45] Date of Patent: Apr. 7, 1998

[54] TREE FEEDING DEVICE OF A TREE HANDLING MACHINE

[75] Inventors: Arto Timperi, Tampere; Mauri Marttila, Valkkinen; Harri Niemi, Tampere, all of Finland

[73] Assignee: Plustech Oy, Tampere, Finland

[21] Appl. No.: 686,926

[22] Filed: Jul. 16, 1996

[30] Foreign Application Priority Data

Jul. 17, 1995 [FI] Finland .................................. 953449
Feb. 21, 1996 [FI] Finland .................................. 960778

[51] Int. Cl.$^6$ .............. B27B 31/00; B27C 1/12; A01G 23/08
[52] U.S. Cl. .............. 144/250.17; 144/4.1; 144/242.1; 144/248.3; 144/24.13; 198/626.1
[58] Field of Search .............. 198/626.1, 699.1, 198/692; 144/24.13, 4.1, 34.1, 242.1, 248.3, 248.5, 248.7, 250.17, 335, 336, 338, 343

[56] References Cited

U.S. PATENT DOCUMENTS 4,222,420  9/1980  Karlsson .
4,742,854  5/1988  Forslund .
4,753,338  6/1988  Ketonen .
4,883,159  11/1989  Ketonen .
5,570,732  11/1996  Andreasson .................. 144/248.3

FOREIGN PATENT DOCUMENTS 0 427 727   11/1993  European Pat. Off. .
953333       1/1996   Finland .
500766       8/1991   Sweden .
WO 89/01854  3/1989   WIPO .

Primary Examiner—W. Donald Bray
Attorney, Agent, or Firm—Pollock, Vande Sande & Priddy

[57] ABSTRACT

A tree feeding device of a tree handling machine has a saw (8) for cross-cutting of a tree trunk, a conveying unit (2) for moving the tree trunk, an actuator (4) for positioning the conveying unit (2) as well as delimbing blades (6) for delimbing the tree trunk. The conveying unit (2) has a rotatable structure with peripheral, substantially rigid surface adapted to support a continuous contact member, which transmits force between the rotatable structure and the tree trunk. The force acting between the rotatable structure and the tree trunk is adapted to be transmitted directly between the peripheral surface and the continuous contact member of elastic material, which is in direct contact with the peripheral surface and capable of moving freely in relation thereto in a manner determined by the load acting on the elastic material.

12 Claims, 7 Drawing Sheets

TREE FEEDING DEVICE OF A TREE HANDLING MACHINE

The present invention relates to a tree feeding device of a tree handling machine. The delimbing of the trunk after the felling of the tree is performed in such machines by pulling the tree through the blades of the delimbing means. Because the size of the tree, that is, its diameter and mass, the number of branches and their strength as well as the speed of the tree trunk have an essential influence on the result of the delimbing operation, the force and friction acting on the tree trunk through the conveying means of the feeding device is one important factor.

The principle of the delimbing is such that the tree trunk should be pulled through the delimbing means by as large force as possible without the sliding or slipping of the contact member of the conveying unit. In this case the pressing of the conveying unit against the surface of the trunk must be efficient, which means high surface pressure, and if the area of the contacting surfaces is small, the tree often will be damaged. Because of this the area of the contact means in contact with the trunk must be as large as possible.

For moving the tree trunk, the conveying unit has a rotatable structure, a wheel supporting a continuous contact member on its outer peripheral surface, or a plurality of wheels, usually a pair, around which a continuous member is entrained.

Metallic chain constructions are commonly used in conveying units with a plurality of wheels. The force moving the chains is transmitted from a hydraulic motor by means of a sprocket wheel to the chains moving the contact member.

In Finnish Patent No. 69233 is shown a construction where a roller chain of three chain rows travels around an idler wheel and sprocket wheel. During the use the chain is supported by rails supporting the rollers of the chain almost along the entire length between the wheels. Elements taking hold of the tree to be pulled are attached to the chain links. The holding means attached rigidly to the side plates of the chain may damage the tree surface relatively deep, which essentially lowers the use value of the tree.

U.S. Pat. No. 4,742,854 shows a feeding device of a grapple harvester where metallic chains transmit the conveying force to a trunk, like in the above-mentioned embodiment. In the chain links of this US-publication, supports are attached over the hole width of the chain to which either grip spikes or elastic plates made of rubber can be attached using for example screw-nut mounting. In columns 7 and 8, lines 62 to 2, is mentioned that the pieces can be replaced also with an endless belt, which will be placed on the top of the chain in the same position as the rubber plates. The purpose of the rubber pieces is to diminish the damages caused to the tree and accomplish a better engagement with the tree trunk. However, the construction is complicated and costly, because chain construction forms the base thereof. The rubber blades fixed by means of screws are subjected to a very high stress at least at their fixing points and the maintenance requires time. The replacement of the blades with a belt does not bring about an improvement either, because the belt will not be retained in its place without a proper attachment.

Swedish laid-open publication 467102 shows a construction where the movement is transmitted from the drive motor through a chain of metallic construction to a rubber element, which is supported by side plates attached to chain pins. To opposite side plates are attached steel chains, which partly support the rubber element and also transmit the conveying power to the trunk. As in the previous case, also this construction is complicated and costly, and consequently the maintenance requires time.

Finally, in single wheels serving as conveying units, a peripheral surface facing the tree trunk is coated with an annular rubber member rigidly attached to the surface, most commonly by vulcanizing. The rubber has only a limited deforming capability in this construction. International publication WO89/01854 is one example of such construction.

The purpose of the invention is to provide a simple construction which would be reliable in operation, would save the tree trunk and could be serviced on the working site or in its immediate vicinity, and could use spare parts which are not expensive. A well-operable lightweight construction is one important purpose of this invention.

The invention is based on the idea that a chain of metallic construction or vulcanization or other rigid attachment to the peripheral surface is entirely rejected and the contact members in the conveying units taking hold of the tree on both sides are replaced with an endless belt-like element of uniform elastic material or a continuous annular member disposed around a wheel. It is characteristic to the invention that the force acting on the tree trunk and moving it is arranged to be transmitted from the drive wheel of the conveying unit through a belt-like element or an annular element made of elastic material. Constructions of this type conform to the external shape of the conveyed tree trunk and the conveying force which the contact member is capable of transmitting to the trunk will be as high as possibe. So that the torque (drive moment) applied by the drive motor driving the belt could be transferred to the elastic contact member, it lies freely over a large contact area against the outer peripheral surface of the rotatable structure.

One construction form is such that the contact member is a belt passed around a drive wheel and at least one idler wheel. On the inner surface the belt resembles a row of V-belts or variator-type belts, which along the thinner portions are joined to each other. The number of these portions can vary, and in principle a construction consisting of only one V-belt or variator belt can be used. The peripheral surface of the wheels is shaped to correspond to the inner side of the belt. Another alternative is to use a belt with for example a toothed inner surface, whereby the teeth fit into the corresponding toothing of the drive wheel.

The outer surface of the belt is so shaped that it affords as good and firm contact with the pulled tree trunk as possible. The belt can be also layered in such a fashion that the friction with the drive wheel is as high as possible and the wear resistance and the engagement with the tree trunk is optimal. The belt can have thicker edge portions and a thinner middle portion, in which case better it conforms to the approximately circular cross-section of the trunk.

In case of a single wheel serving as the conveying unit, a piece of elastic material is attached on the outer periphery of the wheel to move freely in a manner determined by the load. The piece moves freely in relation to support surfaces limiting it laterally; that is, in the direction of the axis of rotation of the wheel, and a in relation to a bottom surface limiting it in the direction of the centre part of the wheel. The support surfaces may be slanting, converging towards the centre part of the wheel, wherein the cross section of the elastic material includes a corresponding wedge-shaped part, which under load presses against said support surfaces. The support surfaces can also be parallel and perpendicular against the axis of rotation or also diverging from each other towards the centre part. The wheel can in all circumstances convey the required drive also to the elastic material through its peripheral surface consisting of the lateral support surfaces and the bottom surface.

The piece formed of elastic material is easy to mount in an annular form on the periphery of the wheel, for example in a manner that the body of the wheel is formed of two halves which can be connected together in the direction of the axis of rotation, wherein the wedge-formed lower part of the piece is situated between the halves. This provides the advantage that the elastic material can easily be changed to new.

The following advantages of the feeding device of the invention can be mentioned:

low surface pressure high traction force as consequence of the foregoing, a construction which will damage a tree to a minimum extent, construction suitable for series production, being at the same time light and simple, easy change of the spare parts and reasonable price of the spare parts and construction resistant to soiling.

The essence of the invention will be apparent more precisely by means of the following description with reference to the accompanying drawings showing some embodiments of the invention.

In the drawings:

FIG. 1 shows a general view of a forest machine grapple and a tree feeding device included therein according to the first embodiment, FIG. 2 shows a section of one conveying means of the tree feeding device taken along the plane of the axes at rotation, FIG. 3 shows the conveying unit in side view, FIG. 4 shows one way to transmit the movement of the drive wheel to the belt, FIG. 5 shows one cross-section shape of the belt, and FIG. 6 shows another possible cross-section shape of the belt and the surface construction of the wheel.

FIG. 7 shows another embodiment, a single wheel of a feeding device in cross section in the direction of the axis of rotation, FIG. 8 shows a wheel in accordance with a second embodiment, FIG. 9 shows an elastic piece with an alternative form, and FIG. 10 shows the part in which the wheels according to FIGS. 7 to 9 can be used.

FIG. 1 shows a tree feeding device, a grapple mounted on the end of a hydraulically operated boom of a forest machine capable of moving in terrain, the machine being in this case a grapple harvester. To the frame 1 of the device are attached a pair of conveying units 2 taking hold of the tree and conveying it, the conveying units being connected to the frame 1 pivotally so that they can be moved by means of hydraulic cylinders towards a tree trunk remaining therebetween 4 so that the tree trunk will be clamped between moving contact members of the conveying units. In each conveying unit 2 there is a drive wheel operated for example by a hydraulic motor as well as a freely rotating wheel (idler wheel). The movement of the hydraulic motor is transmitted through the drive wheel to a belt 5, which acts as the contact member and will move the tree trunk. Further, hydraulically operable delimbing blades 6 are mounted to the frame of the tree feeding device. These blades are designed to cut off the branches while the tree is moved along driven by the conveying units 2. The delimbing blades 6, being situated on both sides of the conveying units 2 in the direction of the tree trunk, can be also used to press and support the tree trunk. A hydraulically operated chain saw 8 is also mounted in the frame for cutting off the tree for felling and for cutting the trunk to suitable lengths.

FIG. 2 shows one conveying unit 2 in section along the plane of the axes of rotation thereof. One wheel 9 is a drive wheel driven by a hydraulic motor 22. The second wheel 10 is a freely rotating wheel, and the belt 5 travels around both wheels in a closed loop. The inner surface of the belt 5 resembles a construction where several V-belts 7 are attached at their outer sides parallelly to each other to an integral structure. The surfaces of the wheels are equipped with peripheral grooves 14, which exactly correspond to the shapes of the generally V-shaped portions, in this case of trapezoidal cross-section. In this way a considerable common surface between the belt and the wheel is accomplished and this in turn means that the wheel is cabaple of transmitting required torque (drive moment) to the belt.

The drive wheel 9 is rotatably connected to the frame portion 19 of the conveying unit, and the drive motor 22 and a side plate 15 on the opposite side are attached to the frame portion 19. A cover plate 17a of the freely rotating wheel 10 is attached to the side plate 15. A cover plate 17b on the opposite side is attached directly to the frame portion 19. Both cover plates 17a and 17b are attached to elongate holes 21, so that when the free wheel 10 is tightened, the cover plates can be moved correspondingly (FIG. 3). For tightening of the free wheel 10, on one side a tightening screw 20a fixed on the cover plate 17b is attached directly to the frame portion 19 and on the other side the corresponding screw 20b is attached to the side plate 15, which is fixed on the frame portion 19.

Further, in FIG. 2 is shown a rotating axle 12 arranged rotatably in the frame portion 19 through bearings. The axle 12 transmits the drive from the motor to the drive wheel 9. At the other end of the conveying unit there is a fixed axle 13, around which the free wheel 10 is arranged rotatable through bearings.

FIG. 3 shows the conveying unit 2 seen on the side opposite to the drive motor 22. The freely rotating wheel 10 and tightening means 11 thereof are slidable within a guide 16 at the end of the side plate 15. The side plate 15 fixed on the frame portion 19 through screws 18 covers the inner parts of the conveying unit and prevents trashes from entering the inside of the conveying unit. The tightening means 11 can be realized by any solution which allows to change the position of the axis of the wheel 10, and the position of the wheel can be secured by tightening means in the elongate holes 21.

Figure 6:
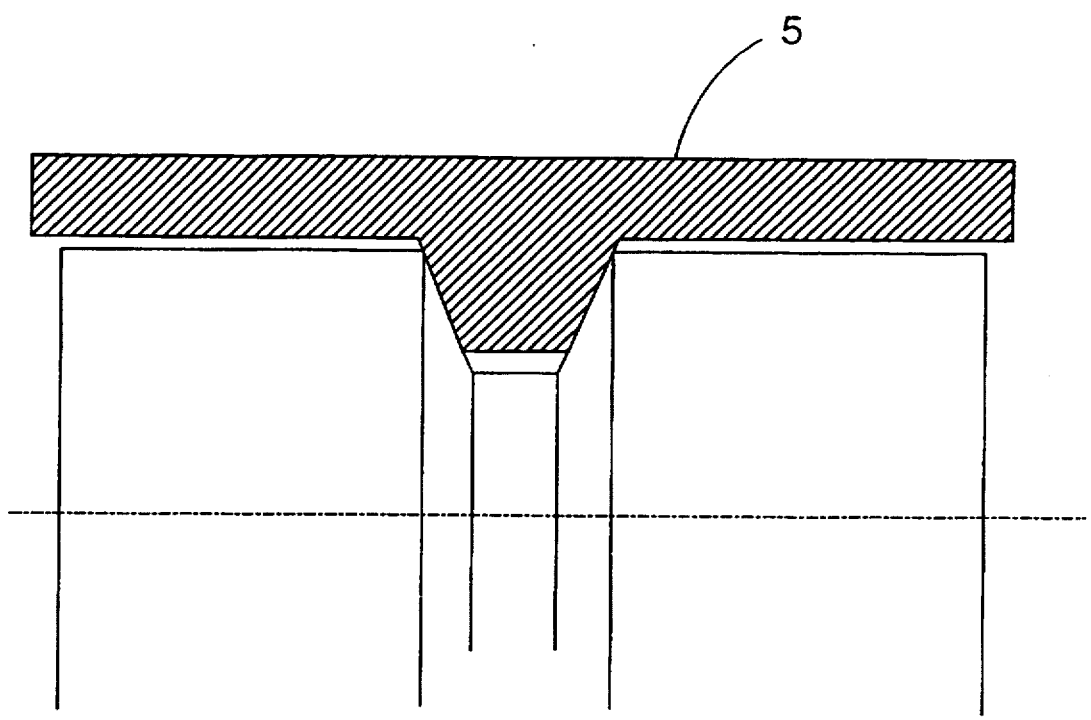

FIG. 6 in turn shows a construction being of the type of one variator belt. On the lower surface of the belt 5 there is one V-shaped, in this case trapezoidal profile converging toward the wheel, and a groove corresponding thereto in the middle of the wheel. On both sides of the profile and groove, the belt and wheel, respectively, are substantially smooth.

An essential feature in this invention is that the conveying units 2 moving the tree trunk have as simple construction as possible and the belt 5 therein which takes hold of the tree trunk and gives movement to the trunk conforms to the trunk surface and its shape so that the engagement would be firm and there would be no slipping. At the same time the minimum damage is caused to the tree trunk. According to the invention the belt is manufactured of a material which contributes to all above-mentioned factors.

Figure 2:
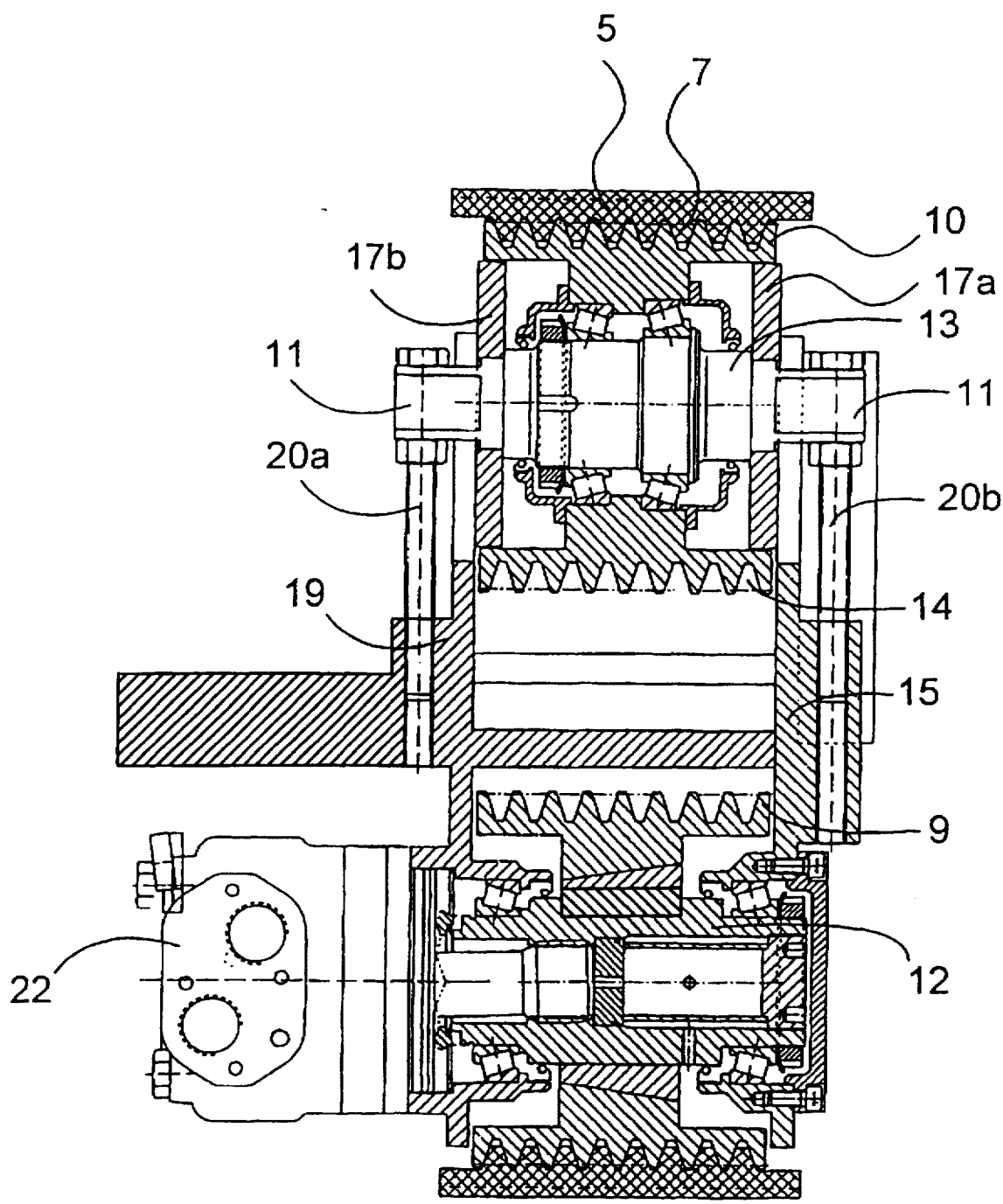
Figure 4:
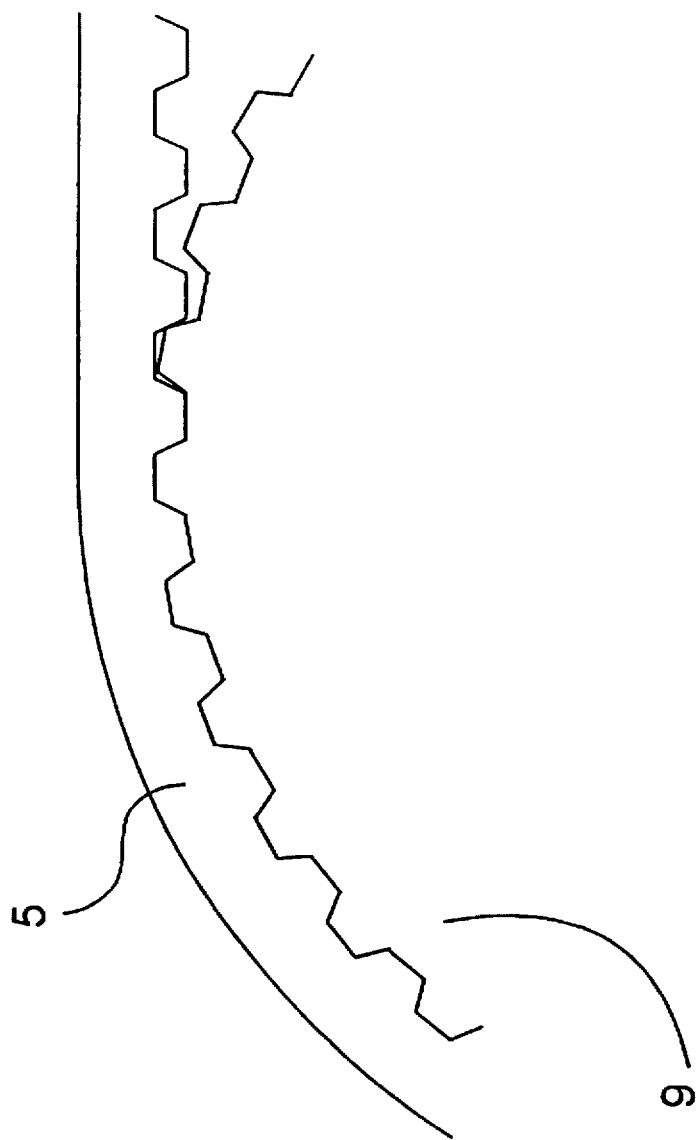
FIG. 4 shows one way to transmit the movement of the drive wheel 9 to the belt by using toothed wheels and a belt 5, the inner surface of which is shaped to a configuration engaging the teeth of the wheel.
Figure 5:
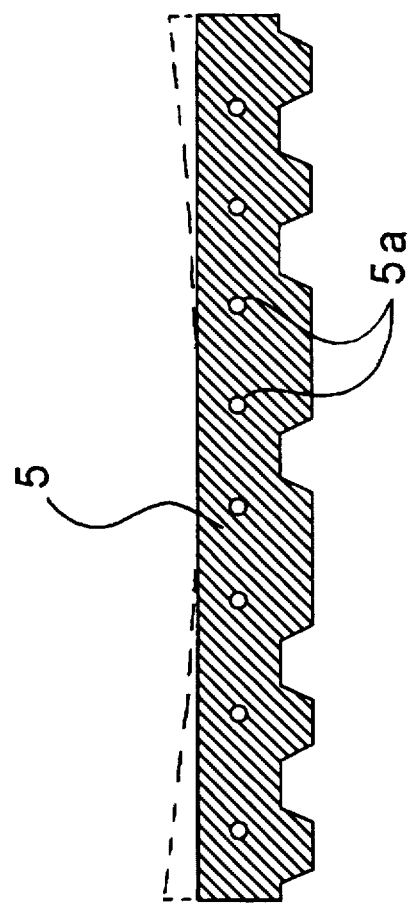
FIG. 5 shows one shape of the cross-section of the belt 5 with varying widths of the trapezoidal portions in the V-profile of the belt inner surface.

According to the invention, the belt 5 can be shaped on both surfaces. The inner surface facing the wheels can be assembled of the v-shaped portions, like of trapezoidal portions, according to FIG. 2. The width of these V-profile portions can vary in the transverse direction of the belt. That is, a profile portion in the middle area of the belt can differ from a profile portion in the edge area for example in such a fashion that the profile portions in the middle are wider that those at the edges. Also the inclination of the side angles of the profile portions can vary and the elastic belt material need not necessarily to fill the V-profile portion entirely till the bottom. As shown in FIG. 5 and 6 the number of profile portions can be 1 to n, that is, the belt can be composed of one V-profile or so many adjacent V-profiles as is appropriate. The construction composed of one or several profiles for transmitting the drive is advantageous in the sense that it can be easily cleaned with a scraper lying inside the conveying unit against the lower surface of the belt and/or the wheel. Another constructional shape according to the invention is that shown in FIG. 4, where the mutually corresponding surfaces of the belt and wheel are toothed. Surface patterns or surface constructions of other type are not excluded, and these can be for example combinations of the toothed belt and V-belt or they can be made by various techniques.

For the use according to the invention the belts can be manufactured of a uniform elastic material with conventional shaping techniques or they can be assembled of sheet like parts through gluing or vulcanizing or in other ways. Further, V-shaped sections can be attached as separate pieces to the lower surface of an upper belt portion forming the contact surface with the tree. In the manufacturing stage reinforcing structures increasing the strength of the belt can be embedded in the belt, such as threads, braidings, wire ropes, tapes or the like, being designated 5a in FIG. 5.

Figure 1:
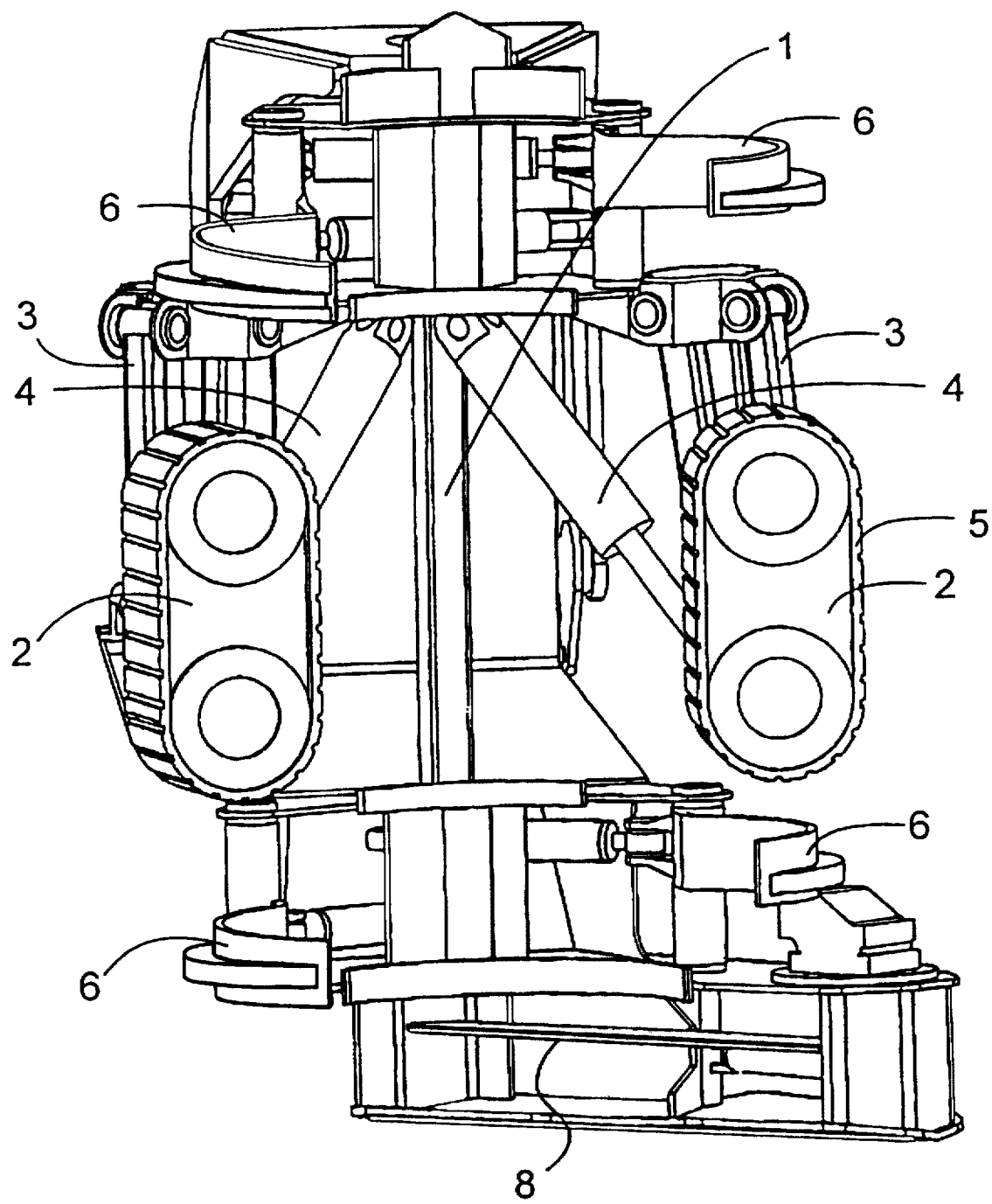
Figure 3:
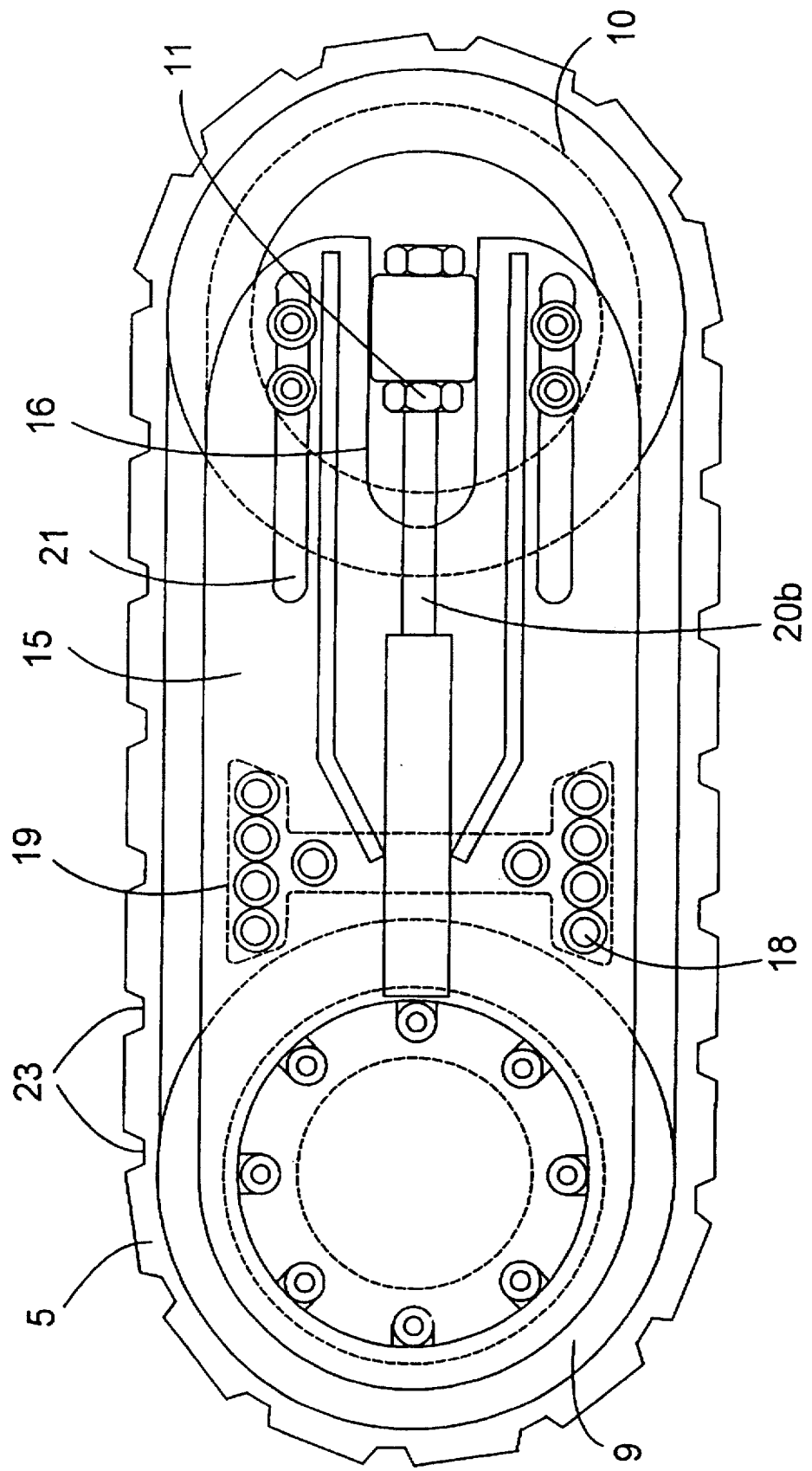

The invention can also be realized using the belt which is assembled of several layers so that on the outer surface of the belt there will be a wear surface resistant to continuous wearing action and affording good friction, and on the inside a construction transmitting the torque of the drive motor 22. Both surfaces can be made using different techniques. The outer surface of the belt to lie against the tree trunk can be uneven or rough, for example by equipping it with transverse grooves 23 according to FIGS. 1 and 3. The surface can be equipped with grooves also in other ways, or protrusions like nodules can be formed thereon. The surface can be treated also in some other way to increase the hold. Also separate pieces, such as studs, spikes, lamellae or the like anti-slipping parts can be attached to the surface. The elastic material of the belt can also be blended with some material increasing the friction. In the direction of its width the thickness of the belt above its profiled construction can vary. For example its edge portions can be thicker than the middle portion, as shown by broken lines in FIG. 5. Also the surface pattern increasing the hold can be different in the edge portions from that in the middle.

One at the advantages of the invention is that the belt can be easily changed by loosening free wheel 10, placing the new belt at its place and tightening the wheel again against the belt. This can be performed directly on the working site with minimum number of tools. Because of the elasticity of the belt the possibility to tighten the wheel is useful also in other respects.

Figure 7:
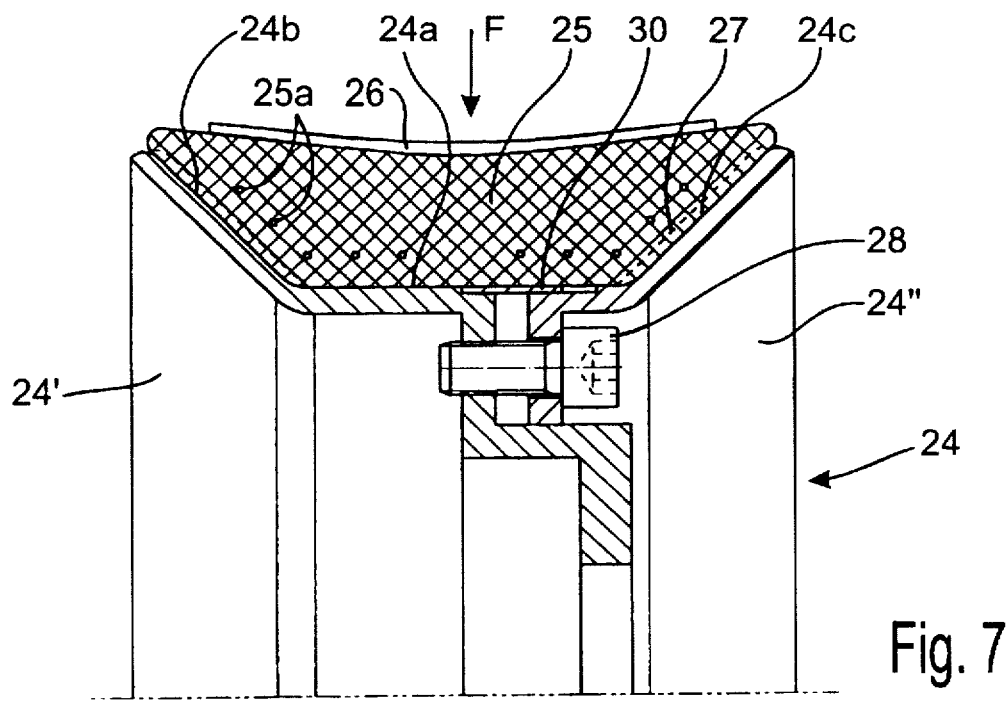

FIG. 7 shows another embodiment, a conveying unit 2 consisting of a single wheel. It is composed of a body 24 connected to a rotation shaft connected to a hydraulic motor (not shown). A piece 25 of elastic material, such as rubber, is placed on the outer periphery of the body. The outer periphery of the wheel body; that is, the periphery surface against the tree trunk, forms a continuous recess running around the wheel, in which recess the piece 25 is placed. The recess has a flat bottom surface 24a and in the radial direction of the wheel from each other diverging, slanting support surfaces 24b, 24c, which form the side walls of the recess. The axially directed bottom surface of the piece 25 rests freely against the bottom surface 24a of the recess and the slanting lateral surfaces on its both sides rest against the support surfaces 24b and 24c, respectively. Further, the outer surface of the piece 25 can have transverse grip adding parts, for example in a manner that the surface is profiled in a suitable manner. In FIG. 7, an exemplifying illustration of this are protrusions 26 in the contact surface, which is slightly concave in rest position. Also other previously known grip constructions can be used, for example chains, wire ropes, or the like, running over the contact surface of the piece 25 and being connected to the body. Further, along the inside of the piece 25 in its longitudinal direction elongated reinforcements 25a can be situated. The configuration of the recess can also be of a different type, for example the portions on the outer edge side of the slanting support surfaces 24b and 25c can be situated more axially directed and the elastic piece 25 is formed correspondingly. Also this embodiment is characterized in that the outer periphery of the wheel body 24 has support surfaces converging each other in a wedge-formed manner, and that the lower surface of the elastic piece 25 is designed wedge-formed in a corresponding manner.

When the wheel is pressed against the trunk of a handled tree, the piece is influenced by a force from the direction of the outer periphery, which force is illustrated with an arrow F. Because the piece 25 is of solid material in the inside and not inflatable, the force is transmitted also to the slanting surfaces which are against each other. Further, radially directed protrusions 27 in the slanting support surfaces 24b, 24c are illustrated with broken lines, the protrusions 27 being received in corresponding grooves in the slanting surfaces of the piece 25 to ensure contact between the body 24 and the piece 25. Despite the shaping of this type material surface will have free movability over a certain area. Free movability and the configuration of the piece 25 provide a variator type force transmission between the wheel body 24 and the elastic piece 25. In addition, elastic properties of the piece 25 can be completely utilized. Lack of vulcanizing enables free movability of the lateral surfaces and the bottom surface of the material under load.

FIG. 7 illustrates further how the body 24 is composed of two halves 24' and 24". The halves are disc-like parts, which are formed of plate material in a manner that a cylindrical centre part of a first half 24' is situated in an opening in the centre of a second half 24". Around the cylindrical centre part of the first half 24' there is a radially extending plate part having holes at suitable angular distances for fixation means. In the edge of this radially directed part there is connected an axially directed plate part forming partly the bottom surface 24a of the outer periphery recess, said plate part having a plate part forming said slanting support surface 24b at its outer edge. The second half 24" has around the central opening a radially directed plate part having also at regular distances holes for fixation means, and in the outer edge of this part there is an axially directed plate part forming the second half of the bottom surface 24a of the recess, to the outer edge of which plate part there is connected a part forming the second slanting support surface 24c.

The halves can be manufactured by moulding, welding, roll forming or by any other suitable manner.

The halves 24' and 24" can be attached together by pushing the opening of the second half 24" around the cylindrical part of the first part 24', and by connecting the parts together by means of fixing means 28, such as bolts, which are passed through aligned holes of the radially directed plate parts of the halves. When mounting the elastic piece 25 on the outer periphery of the body 24, it can be placed in the first half 24' from the side, and the second half 24" is subsequently pushed from the side to the first half 24'.

Figure 8:
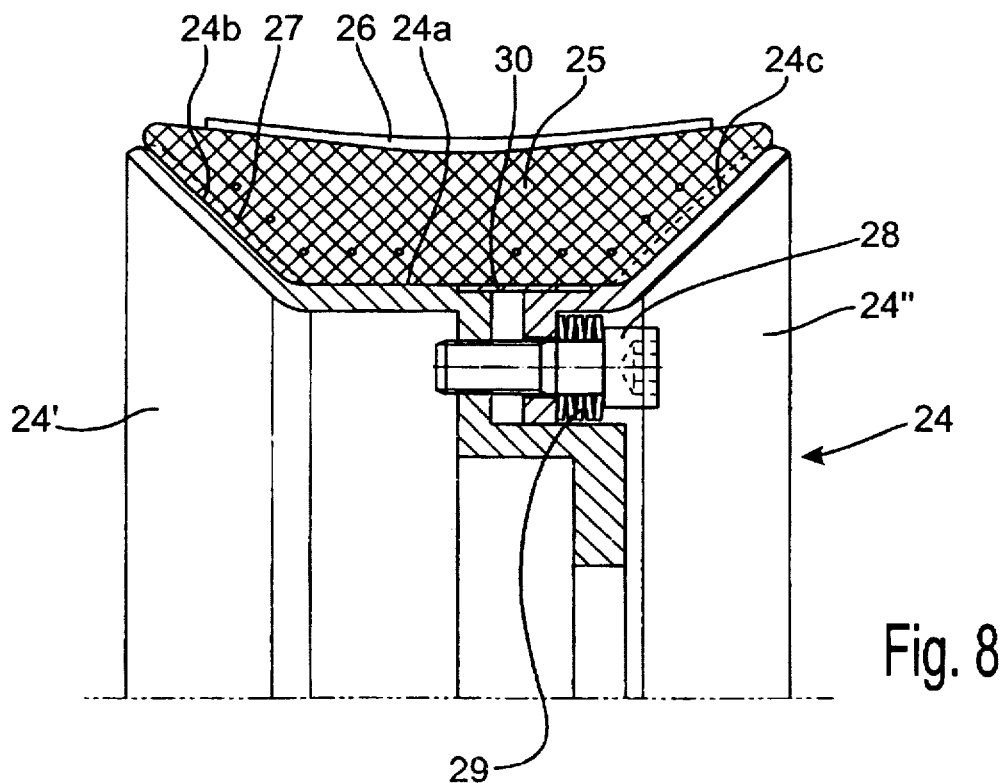

FIG. 8 shows an alternative in which the general operative principle and the configuration of the body 24 and the piece 25 are the same as in FIG. 7. The fixing between the halves 24' and 24" are here formed to be elastic in a manner that the halves 24' and 24" are pressed in the axial direction against each other with a certain spring force which is obtained by means of a spring 29 placed between the second half 24" and the head of the bolt functioning as the fixing means 28. In this manner more alternatives are provided for the configuration of the wheel because also the halves 24', 24" are free to move in relation to each other in an elastic manner when the force acts on the piece 25 from the direction of the arrow F.

Further, FIGS. 7 and 8 show a ring 30 which can be used in connection with the mounting for closing a slot between the halves 24', 24" in the bottom of the recess.

Figure 9:
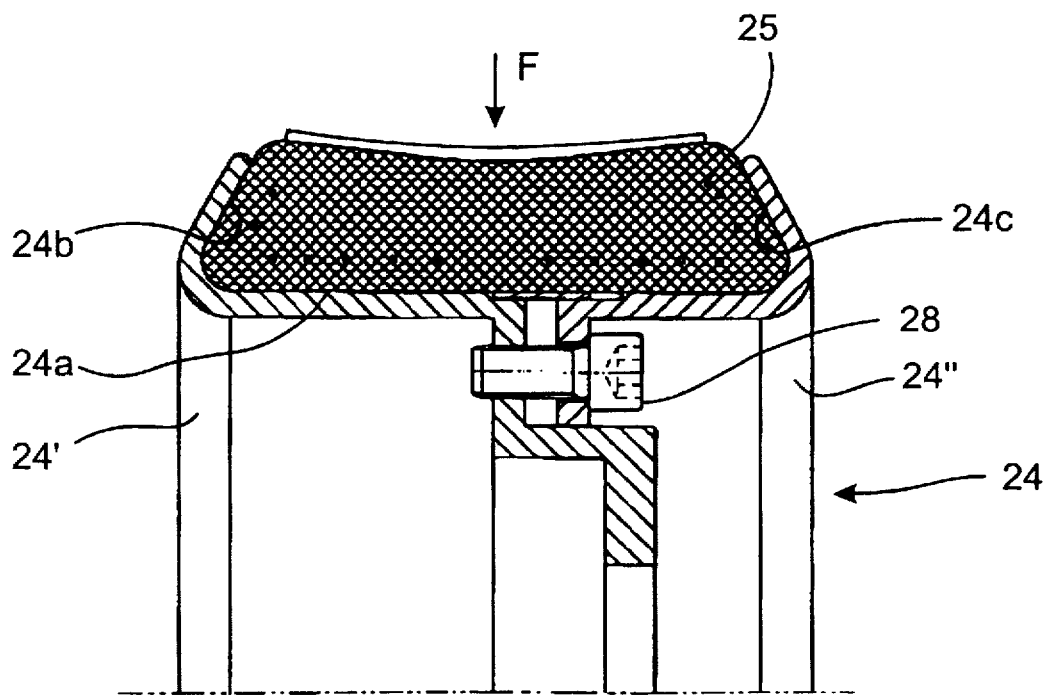

FIG. 9 shows an alternative configuration for the recess and the elastic piece 25, in which configuration the support surfaces 24b, 24c diverge from each other when the centre part of the wheel is approached. In this alternative, the piece 25 has a corresponding cross section which is wider at its bottom, and the piece is properly protected. The support surfaces 24b, 24c can also be parallel and perpendicular to the axis of rotation, and the piece 25 can be shaped correspondingly.

Figure 10:
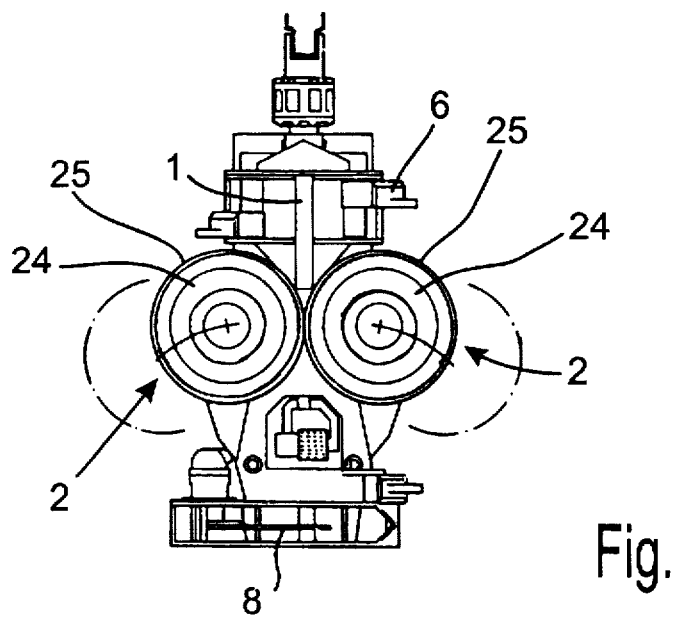

FIG. 10 shows a part in connection of which the tree feeding device is used. The part is a tree handling part similar to that of FIG. 1, situated on the end of a boom of a forest machine capable of moving in terrain, and it has a pair of above described wheels for feeding a tree during its handling. It is also possible that only one of the wheels is in accordance with the invention, but preferably both wheels have structures described above.

The embodiments are not restricted to those illustrated in the FIGS. 7 to 10, but they can be modified. The construction of the body 24 can be of a different type; if allowed by the form of the recess, it can be manufactured for example of a single piece, wherein the annular piece 25 should, however, be placed in a cut form around the shaft and connected together at the ends. The piece 25 may also have some cavities, but it is always massive to the degree that the force effected by feeding is transmitted to the side surfaces 24b, 24c and the bottom surface 24a.

In all embodiment described herein, the minimum requirement is that at least one conveying unit 2 in the tree feeding device has the construction of the invention. However, it is advantageous that both conveying units 2 which can be moved against a tree trunk in a pair on the opposite sides have a construction according to the invention.

We claim:

1. A tree feeding device of a tree handling machine having a saw for cross-cutting a tree trunk, a conveying unit for moving the tree trunk, an actuator for positioning the conveying unit, and delimbing blades for delimbing the tree trunk, the conveying unit comprising at least one rotatable body with a peripheral, substantially rigid surface extending around an axis of rotation and in the direction of the axis of rotation, and a continuous contact member of elastic material adapted to be supported on the peripheral surface and to transmit a force acting between the rotatable body and the tree trunk for moving the tree trunk, said force being transmitted directly between the peripheral surface and the continuous contact member, and the continuous contact member being in direct contact with the peripheral surface and capable of moving freely in relation thereto in a manner determined by a load placed on the elastic material by said force.

2. A tree feeding device according to claim 1, wherein said conveying unit comprises a drive wheel and at least one idler wheel, and said continuous contact member comprises a belt-like element of elastic material passed around and in contact with the drive wheel and the at least one idler wheel.

3. A tree feeding device according to claim 2, wherein an inner surface of the belt-like element is in contact with the drive wheel of the conveying unit and the surface of the drive wheel comprises a profiled construction for transmitting said force.

4. A tree feeding device according to claim 3, wherein the inner surface of the belt-like element in contact with the drive wheel has in a cross section perpendicular to the advancing direction of the element a profile form comprising one V-belt shape or a plurality of parallel V-belt shapes joined mutually at their outer edges, and wherein the surface of the drive wheel is shaped to correspond to said profile form.

5. A tree feeding device according to claim 3, wherein the surfaces of the belt and the drive wheel in contact with each other have a toothed configuration in a plane perpendicular to the axis of rotation.

6. A tree feeding device according to claim 2, wherein contact between the belt-like element and the tree trunk is increased by means of grooves or gripping pieces on the outer surface of the element or of friction material mixed in the elastic material of the element.

7. A tree feeding device according to claim 2, wherein supporting and reinforcing elements are embedded in the belt-like element.

8. A tree feeding device according to claim 2, wherein the thickness of the belt-like element varies in the width direction of the element.

9. A tree feeding device according to claim 2, wherein the belt-like element is supported on a freely rotating idler wheel, and means is provided for adjusting the distance of this idler wheel from the drive wheel.

10. A tree feeding device according to claim 1, wherein said rotatable body comprises a wheel connected to a rotation shaft, and said belt-like element comprises an annular piece of elastic material placed at least partially in a recess on the outer periphery of the wheel, which recess is limited in the direction of the axis of rotation of the wheel by support surfaces against which lateral surfaces of the annular piece lie, a bottom surface of the annular piece lying against a bottom surface of the recess, and the annular piece being capable of moving freely in relation to the surfaces of the recess in a manner determined by the load placed on the elastic material.

11. A tree feeding device according to claim 10, wherein the wheel is formed of separate pieces attachable together and detachable in the direction of the axis of rotation.

12. A tree feeding device according to claim 11, wherein said wheel further comprises a spring-loaded connector for resiliently connecting said separate pieces together in the direction of the axis of rotation.

* * * * *